Figure 1:
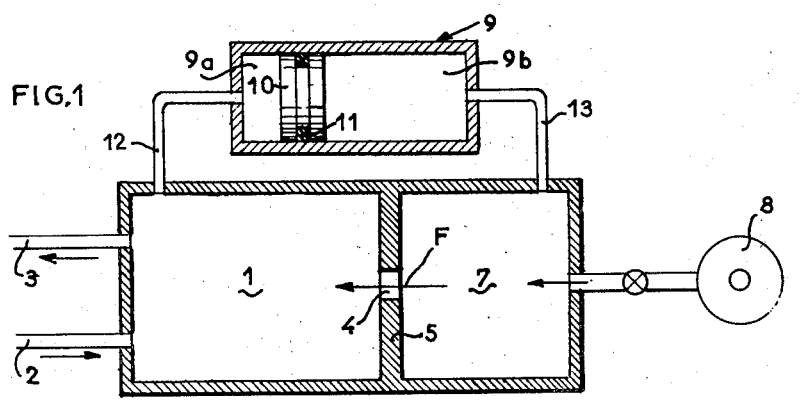

United States Patent Office 3,161,413
Patented Dec. 15, 1964

3,161,413
APPARATUS FOR PREVENTING LEAKAGE FROM AN ENCLOSED SPACE OR A CIRCULATING SYSTEM CONTAINING A POSSIBLY NOXIOUS FLUID
Pierre Audemar, Mulhouse, France, assignor to Societe Alsacienne de Constructions Mecaniques, Mulhouse, France, a company of France
Filed Jan. 11, 1960, Ser. No. 1,574
Claims priority, application France Jan. 14, 1959
4 Claims. (Cl. 277—3)

This invention relates to apparatus for ensuring a continuous flow of fluid, at a limited but uniform rate (in terms of volume per unit time) into a chamber or other closed space, irrespective of possible changes of pressure in such space, in such a way as to make practically impossible any blow-back of fluid from the chamber.

The invention is more especially concerned with the problem of preventing any escape of corrosive, poisonous, or otherwise dangerous or noxious fluids, especially gases, from closed systems in which they are circulated. When such systems include mechanical means, such as a pump, for causing the circulation, the motor which drives the pump or the like must be outside the system and its shaft must pass through a wall of the enclosed system; and the problem arises of sealing the clearance between the shaft and such wall against outward leakage of the noxious fluid.

In many such cases, the provision of an effective sealing gland is impracticable; and the sealing can be better effected by ensuring a steady and continuous flow of an innocuous fluid, e.g. a gas (non-reactive with the noxious fluid circulated in the closed system) through the clearance into the closed system. If, however, the interior of the closed system is, or may be, subject to considerable variations of pressure, fortuitous or otherwise, the innocuous fluid must be supplied at a pressure which, at any given instant, exceeds the pressure subsisting in the closed system; and if the innocuous fluid is supplied at constant pressure, this pressure must be greater than the highest pressure to be expected in the closed system.

Broadly speaking, an object of this invention is to provide, in combination with a chamber, or other closed space, which may contain a dangerous or noxious fluid and has an opening through which such fluid could escape, means for injecting into said chamber or the like, through said opening, a continuous stream of non-noxious, non-reactive, fluid at a controlled, constant flow-rate and means for automatically and promptly compensating pressure-differences between the interior and the exterior of the chamber or the like, and means for ensuring the continuous flow of fluid, through said opening, into the chamber or the like, even when the pressure-difference across such opening is nil.

According to a further object of the invention, the pressure-difference-compensating means abovementioned comprise a compensating chamber, of which one end communicates with the chamber or the like containing the noxious fluid and the other end with a second chamber into which the non-noxious fluid is introduced at the controlled flow-rate, together with a movable, fluid-tight partition, such as a free piston or a flexible non-elastic diaphragm, in the compensating chamber between the two said ends thereof.

Yet a further object of the invention is the application of the principles embodied in the objects set forth in the two preceding paragraphs hereof to a complete apparatus for circulating fluids having dangerous or noxious characteristics, such apparatus including a closed system in which such fluid is circulated, means for circulating such fluid, such means including a rotary or otherwise movable member extending from the inside of such closed system to the exterior thereof through a clearance opening, a chamber receiving a volumetrically constant flow of an innocuous (and non-reactive) fluid, means for ensuring a steady flow of such innocuous fluid from the last-mentioned chamber into the closed system, bearings supporting said movable member outside of the closed system and of the last-mentioned chamber, means for ensuring a flow of the innocuous fluid from such chamber into the exterior space in which such bearings are situated, together with the previously mentioned means for compensating pressure-differences between the closed system and the last-mentioned chamber and for ensuring a continuous volumetrically constant flow of the innocuous fluid from the last-mentioned chamber into the closed system.

Yet other objects of the invention will appear in the following description of specific embodiments of the invention.

The scope of the invention is defined in the hereto appended claims.

By way of example only, and without implied limitation of the scope of the invention as defined in the appended claims, certain specific embodiments of the invention are illustrated in the accompanying drawings and hereinafter described with reference thereto.

Figure 2:
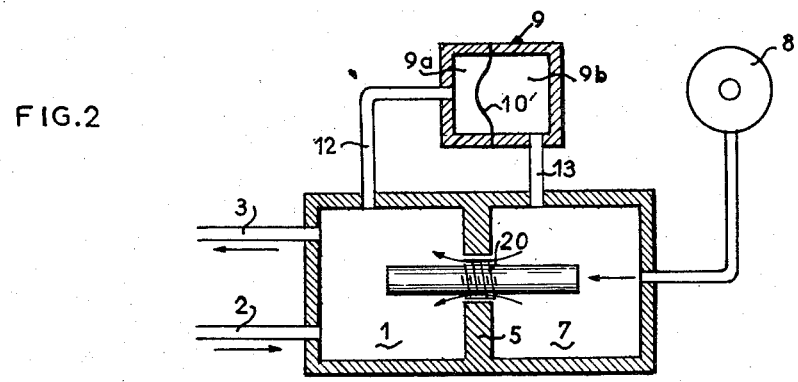
Figure 3:
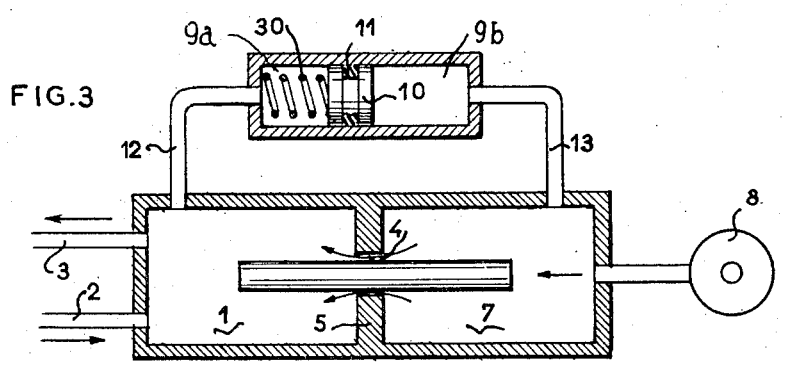
Figure 4:
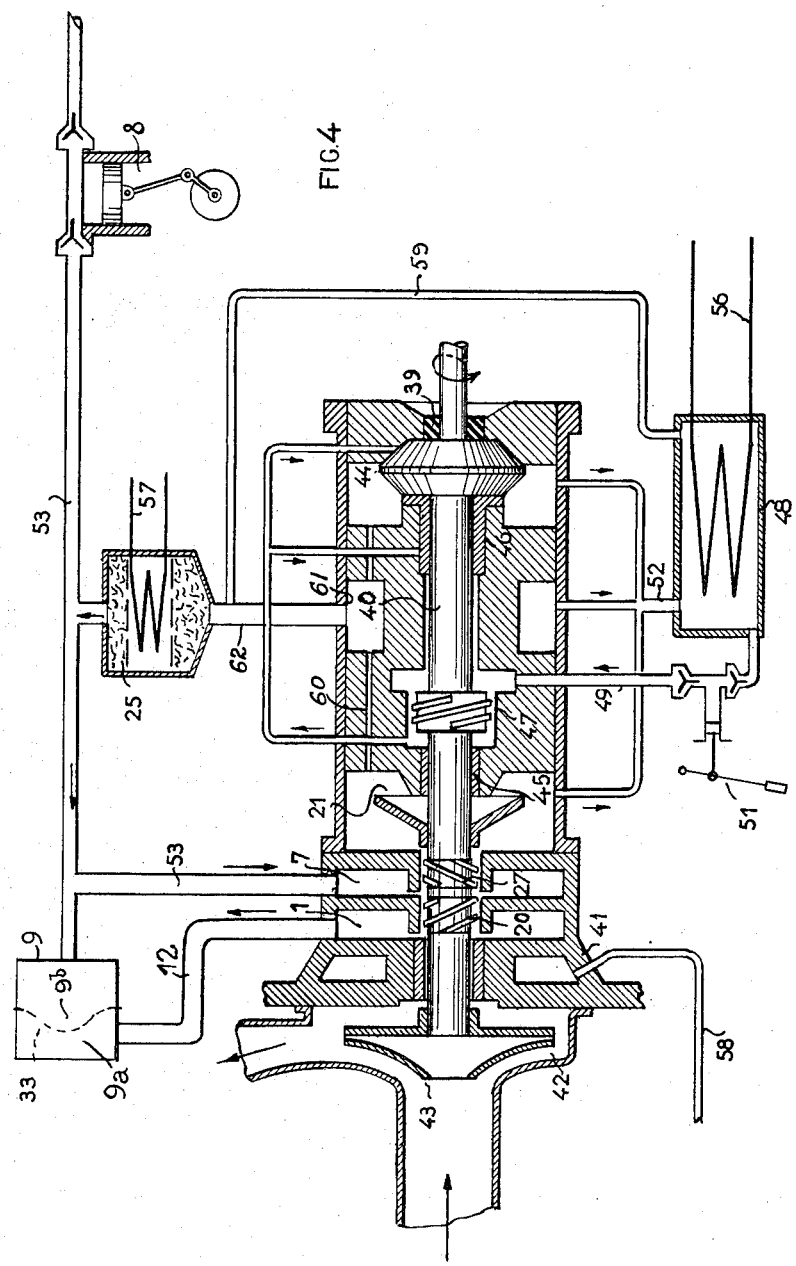

In the drawings,

FIGURES 1, 2 and 3 illustrate schematically, and partly in section, three forms of apparatus embodying the principal features of the invention; and FIGURE 4 illustrates, somewhat schematically, and partially in axial section, an installation for circulating a dangerous or noxious gas embodying the features of the invention.

Referring to FIGURE 1, a first closed chamber 1, through which a (presumptively) dangerous or noxious fluid is circulated, entering by a duct 2 and leaving by a duct 3 (as indicated by arrows) includes a bounding wall 5 having an opening 4 communicating with a second closed chamber 7.

A positive displacement pump 8 delivers, at a volumetrically constant rate, a second, innocuous and non-reactive fluid into chamber 7, as indicated by an arrow. The flow of fluid into chamber 7 causes fluid to flow from chamber 7, through opening 4 into chamber 1, as indicated by arrow F.

The apparatus further includes a compensating chamber 9, in which is a movable partition, in this instance a free piston 10, rendered fluid-tight by a seal 11, subdividing chamber 9 into two compartments 9a and 9b, of which compartment 9a communicates, via a duct 12, with chamber 1, and compartment 9b communicates, via a duct 13, with chamber 7.

Means (not shown) are provided for ensuring a continuous, uniform feeding of fluid from chamber 7 to chamber 1 via opening 4.

It will be evident that variations of pressure in chamber 1 will be immediately communicated to chamber 7 by displacement of piston 10. Therefore, the means causing transfer of fluid from chamber 7 to chamber 1 never have to work against a great pressure-difference.

In the embodiment of FIGURE 2, the free piston 10 of FIGURE 1, is replaced by a flexible, non-resilient, fluid-tight diaphragm 10x; and the opening in wall 5 providing communication between chambers 1 and 7 is traversed, with clearance, by a rotary shaft provided with helical elements 20 extending into the clearance, which constitute the means for ensuring a continuous flow of fluid from chamber 7 to chamber 1.

In the embodiment of FIGURE 3, the opening 4 likewise accommodates, with clearance, a rotary shaft; and the piston 10 in the compensating chamber 9 is urged by a spring 30 towards the compartment 9b. In this embodiment, the displacement pump 8 is designed to deliver fluid into the chamber 7 at a constant, volumetric rate greater than the rate at which the piston 10, urged by the spring 30, can deliver fluid from compartment 9b, via duct 13, into the chamber 7 when the pressures in chambers 1 and 7 are equal.

Normally, therefore, when the pressures in chambers 1 and 7 do not differ much, the flow of fluid provided by pump 8 is sufficient to hold back the piston 10 against the effort of spring 30 and keep the piston 10 stationary, while providing excess flow which must escape through opening 4 from chamber 7 into chamber 1; but if the pressure in chamber 1 rises suddenly, the rise of pressure in compartment 9a will assist the effort of spring 30 and move the piston 10 towards compartment 9b and thus supplement the flow of fluid into chamber 7 and maintain the flow through opening 4 into chamber 1, so that the combined action of the pump 8 and the spring 30 serve to maintain in all conditions a continuous flow of fluid from chamber 7 into chamber 1 through opening 4 and the spring 30 constitutes a means, additional to the pump 8, for maintaining this continuous flow.

FIGURE 4 illustrates a complete apparatus for circulating a noxious gas or vapour, which must not be allowed to escape from the circulation system. This apparatus comprises elements corresponding to those illlustrated in FIGURE 2, some of which are identified by the same reference characters, namely the chamber 1 and the chamber 7 intercommunicating through an opening traversed, with clearance, by a rotary shaft 40 on which are mounted, in said clearance, helical elements 20, adapted to cause fluid to flow from chamber 7 into chamber 1, a compensating chamber 9 subdivided by a flexible, non-elastic, fluid-tight diaphragm 33 into two compartments 9a, 9b, of which compartment 9a communicates, via duct 12, with chamber 1 and compartment 9b communicates, via a duct 53, with chamber 7, and a displacement pump 8 which feeds a non-noxious, non-reactive gas, via duct 53 into chamber 7 at a volumetrically constant rate.

The shaft 40 extends, on the one hand from chamber 1 into a centrifugal pump casing 42, through an opening in a wall 41, with clearance, and carries in the casing 42, a centrifugal impeller 43 which circulates the noxious fluid as indicated by arrows; and on the other hand, with clearance, through an opening in the wall of chamber 7 opposite the opening connecting chambers 1 and 7 into a third chamber 21. Shaft 40 further carries helical elements 27 situated in the clearance of the opening connecting chambers 7 and 21, and adapted to cause a continuous flow of fluid from chamber 7 into chamber 21.

Within chamber 21 are arranged journal bearings 45, 46 supporting shaft 40, which is otherwise unsupported, so that the impeller 43 is overhung, and a thrust bearing 44. Shaft 40 extends through a sealing gland 39 in the right hand end of chamber 21 (as seen in the figure) for connection to a driving motor (not illustrated).

The chamber 21 also contains an enclosed lubricant pump 47, which feeds lubricant, via a duct 49 from a reservoir 48 to the bearings. After passing through the bearings the lubricant falls to the bottom of the chamber 21, whence it is drained back to the reservoir 48 by ducts 52. A manual pump 51 is provided in the run of duct 49 for priming the pump 47.

The non-noxious gas transferred by the elements 27 from chamber 7 into chamber 21 escapes from the top of chamber 21 through a duct 60 into an annular groove 61, and in passing through chamber 21 may be contaminated with entrained droplets or vapour of the luibricant. A chamber 25 is therefore connected to groove 61 by means of a duct 62, through which the escaping non-noxious gas must pass and this chamber contains filter means which separate enrtained lubricant from the escaping gas and returns it, via a pipe 59, to the reservoir 48, the filtered gas being returned, via duct 53, to chamber 7.

Coolant circulating coils 57, 56 are provided for cooling chamber 25 and the reservoir 48 respectively; and the wall 41 is formed as a hollow wall to constitute a cooling jacket, fed with coolant by a pipe 58, for cooling the centrifugal pump 42, 43.

It will be seen that the system 42, 43 in which the noxious gas circulates communicates freely with the chamber 1 and that this gas is prevented from escaping from the space 42, 1, 12, 9a in which it is contained by a continuous inflow of non-noxious gas from chamber 7, supplied by pump 8 and maintained by the helical elements 20, even if the pressures in chambers 1 and 7 become temporarily equal, while the compensating chamber 9 and diaphragm 33 compensate for any sudden increase of pressure in chamber 1. At the same time, the chamber 21 is kept continuously flooded, by the helical element 27, with non-noxious gas, which is recirculated through chamber 7 after filtration in the chamber 25; and, finally, the bearings of the shaft 40 and their lubrication system are fully protected from attack by the nonxious gas or vapour by the non-noxious gas circulated through chamber 21, and from atmospheric contamination by the seal 39.

It will be understood that the scope of the invention, as defined in the appended claims, is not limited to the embodiments particularly described with reference to the accompanying drawings, but includes such modifications and constructional variations requiring no inventive contribution as may be within the competence of those skilled in the art.

What is claimed is:

1. In a device wherein a shaft extends through a wall member and there is a fluid pressure on one side of said wall member, a shaft seal for preventing leakage of fluid along said shaft from said one side of the wall member to the other side thereof, said seal comprising a chamber enclosing said shaft and located on said other side of the wall member adjacent thereto, means for supplying fluid under pressure to said chamber, auxiliary means for forcing the fluid supplied to said chamber to flow along said shaft from said chamber to said one side of the wall member, a cylinder, a partition freely movable in the cylinder and dividing the interior thereof into two compartcents of variable volume, and conduit means directly connecting the respective compartments with the fluid on said one side of the wall member and said chamber whereby variations in pressure on said one side of the wall member are immediately communicated to said chamber via movement of said partition.

2. In a device wherein a rotatable shaft extends through a wall member and there is a fluid pressure on one side of said wall member, a shaft seal for preventing leakage of fluid along said shaft from said one side of the wall member to the other side thereof, said seal comprising a chamber enclosing said shaft and located on said other side of the wall member adjacent thereto, means for supplying fluid under pressure to said chamber, a pump actuated by said shaft to force the fluid in said chamber to flow from said chamber along said shaft to said one side of the wall member, a cylinder, a piston freely slidable in said cylinder and dividing the interior thereof into two compartments of variable volume, and conduit means directly connecting the respective compartments with the fluid on said one side of the wall member and said chamber whereby variations in pressure on said one side of the wall member are immediately communicated to said chamber via movement of said piston.

3. In a device wherein a rotatable shaft extends through a wall member and there is a fluid pressure on one side of said wall member, a shaft seal for preventing leakage of fluid along said shaft from said one side of the wall member to the other side thereof, said seal comprising a first chamber enclosing said shaft and located on said other side of the wall member adjacent thereto, a second chamber enclosing said shaft and located adjacent to said first chamber, means for supplying fluid under pressure to said second chamber, a pump actuated by said shaft to force the fluid supplied to said second chamber to flow along said shaft from the second chamber to the first chamber, an auxiliary chamber, a partition freely movable in said auxiliary chamber to divide the same into two compartments of variable volume, and conduit means directly connecting said first chamber with one of said compartments and the second chamber with the other compartment, whereby variations in pressure in said first chamber are immediately communicated to said second chamber via movement of said partition.

4. In a device wherein a rotatable shaft extends through a wall member and there is a fluid pressure on one side of said wall member, a shaft seal for preventing leakage of fluid along said shaft from said one side of the wall member to the other, said seal comprising a first chamber enclosing said shaft and located on said other side of the wall member adjacent thereto, a second chamber enclosing said shaft and located adjacent to said first chamber, a third chamber enclosing said shaft and located adjacent to said second chamber, means including a supply pipe for supplying fluid under pressure to said second chamber, a first pump driven by said shaft to force fluid supplied to said second chamber to flow along said shaft from the second chamber to the first chamber, a second pump driven by said shaft to force fluid supplied to said second chamber to flow along said shaft from the second chamber to the third chamber, an auxiliary chamber, a partition freely movable in said auxiliary chamber to divide the same into two compartments of variable volume, first conduit means connecting said first chamber with one of said compartments, second conduit means connecting said second chamber with the other compartment, and third conduit means connecting said third chamber with said supply pipe.

References Cited in the file of this patent

UNITED STATES PATENTS

| | | |
|---|---|---|
| 759,659 | Braungart | May 10, 1904 |
| 2,332,150 | Huff | Oct. 19, 1943 |
| 2,844,418 | Audemar | July 22, 1958 |

FOREIGN PATENTS

| | | |
|---|---|---|
| 324,763 | Great Britain | Feb. 6, 1930 |